G. SONNENTHAL & H. BAMFORD.
MACHINE FOR SHAPING METALS.
APPLICATION FILED JULY 10, 1908.
976,754.
Patented Nov. 22, 1910.
3 SHEETS—SHEET 2.
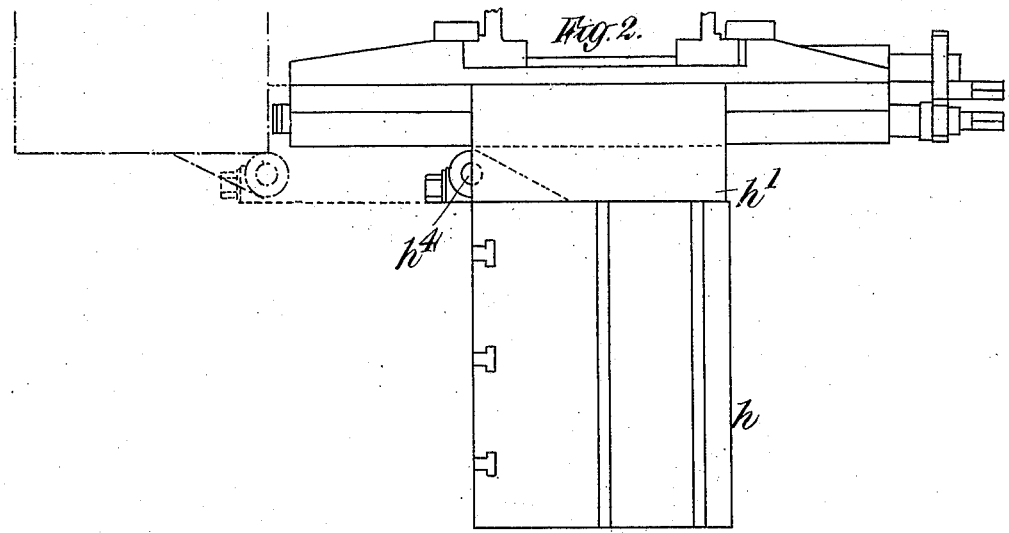
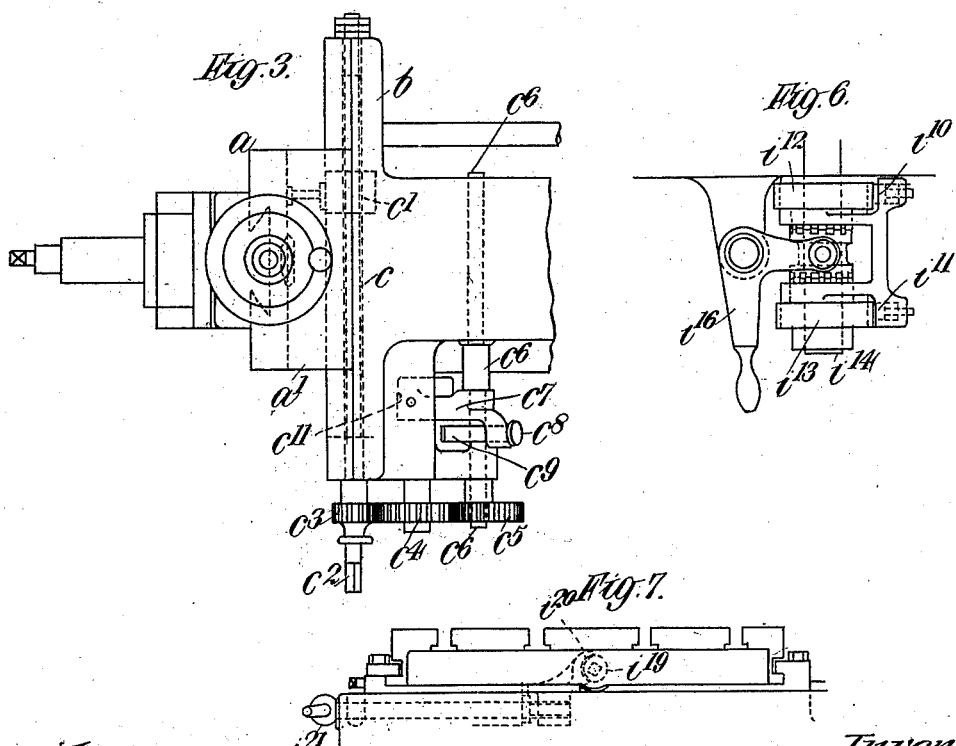
Witnesses
Inventor
George Sonnenthal
Henry Bamford
By James L. Norris
Atty

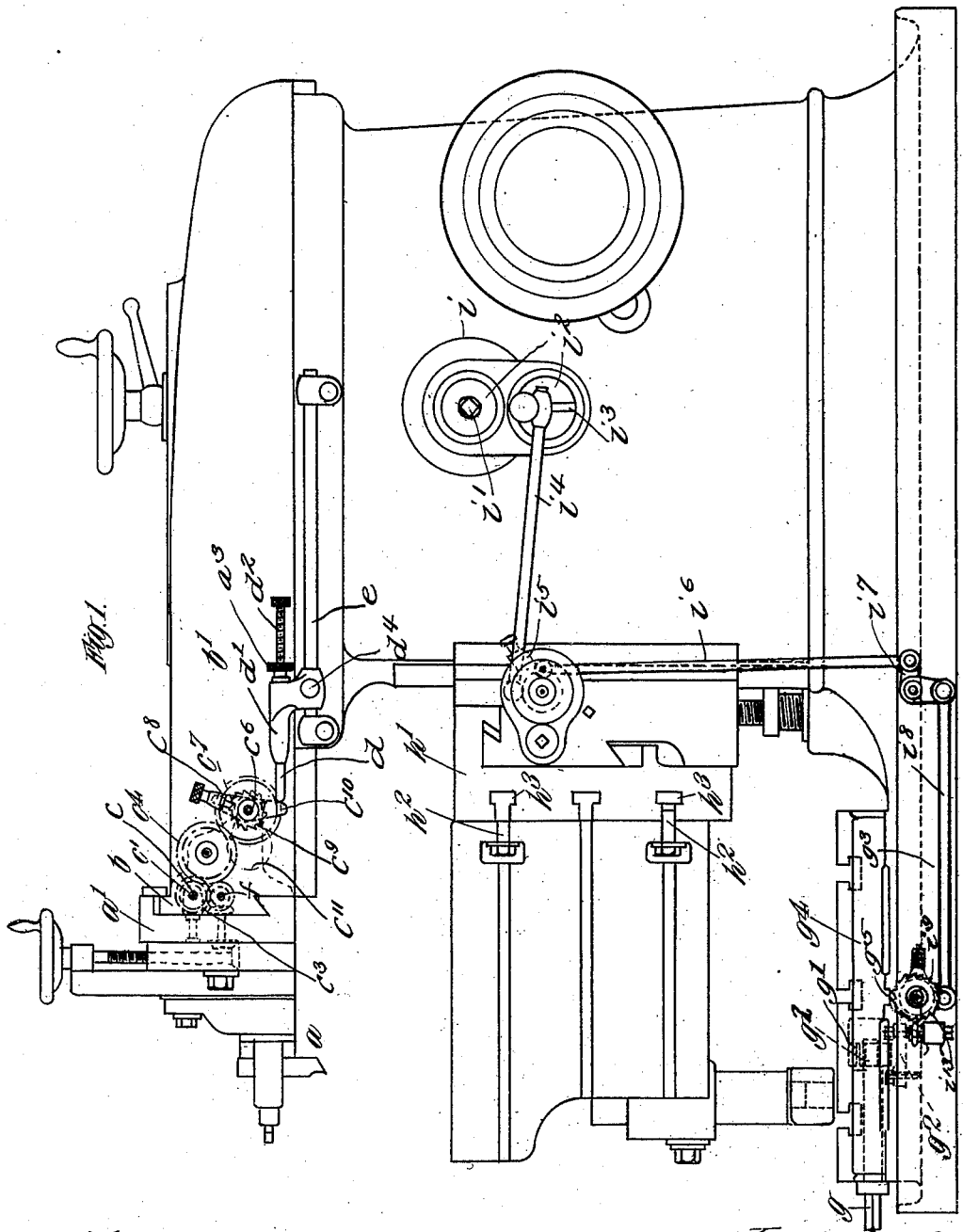

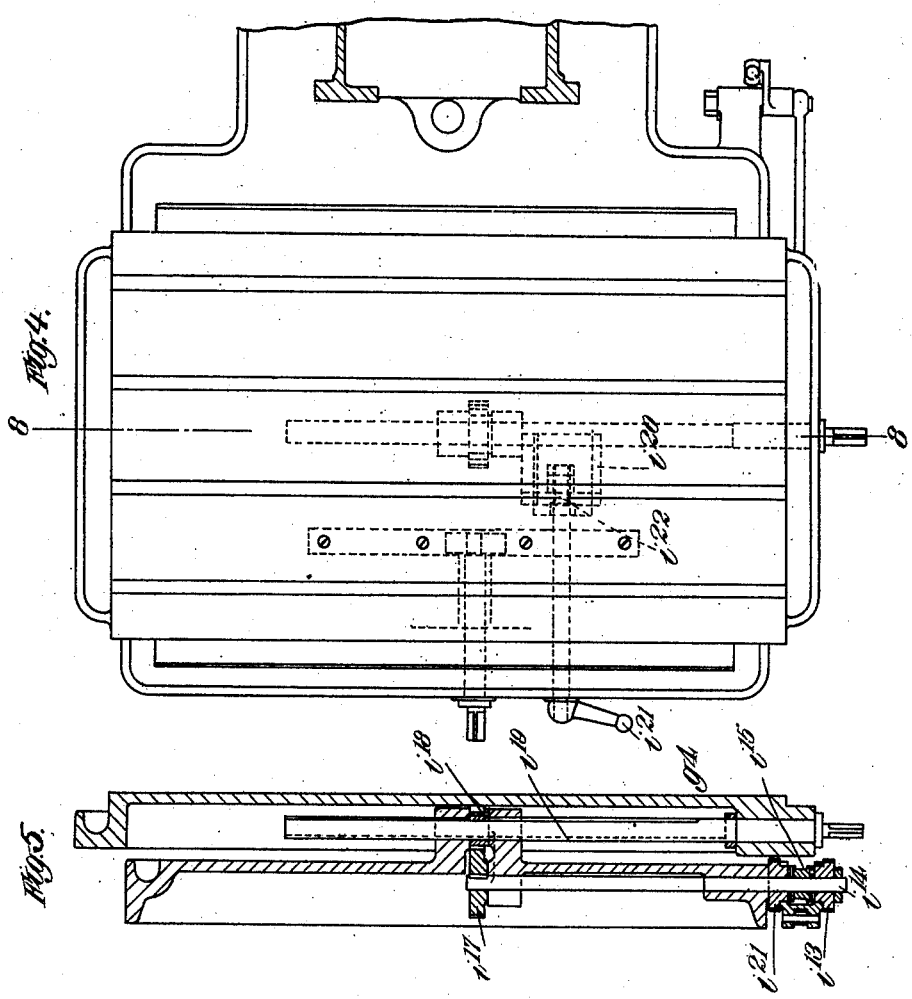

UNITED STATES PATENT OFFICE.

GEORGE SONNENTHAL AND HENRY BAMFORD, OF LONDON, ENGLAND.

MACHINE FOR SHAPING METALS.

976,754. Specification of Letters Patent. Patented Nov. 22, 1910.

Application filed July 10, 1908. Serial No. 442,965.

*To all whom it may concern:*

Be it known that we, GEORGE SONNENTHAL and HENRY BAMFORD, both subjects of the King of Great Britain, residing at 85 Queen Victoria street, in the city and county of London, England, have invented certain new and useful Improvements in or Relating to Machines for Shaping Metal, of which the following is a specification.

This invention relates to shaping machines of the kind used in shaping metal such as cutting keyways in shafts and other operations, the object being to facilitate the adjustment and manipulation of the work and tool relatively to each other and to enable a larger range of work to be dealt with.

The present invention relates to shaping machines of the type which permit of the tool box on the head of the ram being swiveled or moved rotatably and downwardly and also laterally, for machining vertical and angular faces and the top surfaces of objects respectively.

In a shaping machine adapted for accomplishing the objects aimed at and whereby the capacity of the machine is greatly increased, the head of the ram is arranged in the form of a slide along which the tool carriage is adapted for lateral movement; the base of the machine is also provided with a laterally movable bed plate, so that when operating on large objects, upper surfaces may be machined or worked, up to the length of traverse of the tool along the head of the ram. When machining gas engine beds, for example, the object under operation may be securely fastened to the bottom table and the joint for one cap machined, using the tool slide for lateral movement, after which the table is traversed laterally until the joint for the second cap is brought into the position previously occupied by the first one and the process repeated. The lateral traverse of the table may be automatic or self-acting or be effected by hand as required.

Should the work be of a character to necessitate the removal of the table in order to fix large objects on the movable bottom table or bed, the ordinary traveling table may be hinged to its slide so that after slackening the retaining bolts it may be turned or swung out of the plane of the said bottom table or bed thereby obviating the laborious and tedious operation of removing the same incidental to the usual arrangement of the machine.

In order that our said invention may be clearly understood and readily carried into effect we will proceed to describe the same more fully with reference to the accompanying drawings, in which:—

Figure 1 is a side view of a shaping machine illustrating some of our present improvements. Fig. 2 is a plan showing the ordinary traveling table turned or swung out of the position in which it appears in Fig. 1. Fig. 3 is a plan of a means of effecting the lateral movement of the tool carriage. Fig. 4 is a plan showing the mechanism for effecting the traversing movement of the bottom table; Fig. 5 is a section taken along the line 8—8 in Fig. 4. Fig. 6 is a detached view of the clutch and gear in connection with the table and Fig. 7 is a view illustrating the half nut and screw spindle and disengaging device.

The usual means may be provided whereby the shaper head is moved vertically for the purpose of effecting the necessary adjustment of the tool up to the work and also the usual arrangement whereby the angular adjustment of the tool may be effected. The shaper head $a$ is formed or provided with a laterally extending portion or frame $a'$ adapted to slide in guides or grooves in the end $b$ of the ram $b'$. The guiding of the head may be accomplished by means of a dove-tail part as shown. The lateral traversing movement of the shaper head is effected by means of a screw spindle $c$ and nut $c'$ or screw, worm or other suitable gearing may be employed; the actuation of the gear may be effected by hand or automatically.

The nut $c'$ is carried by the part $a'$ of the shaper head and the screw spindle $c$ is formed with a squared end $c^2$ for the application of a handle so that the lateral traverse may be effected by hand. In order that the said traversing movement may be effected automatically, the screw spindle $c$ is provided with a spur pinion $c^3$ adapted to mesh with a spur wheel $c^4$, the latter meshing with a spur wheel $c^5$ on a spindle $c^6$. This spindle $c^6$ is also provided with a weighted lever $c^7$ which carries a pawl $c^8$ arranged to engage with a ratchet wheel $c^9$. An arm $c^{10}$ of this lever is adapted to be operated by an adjustable rod $d$ mounted in a bracket $d'$ on the fixed rod $e$. The rod $d$ is adjustable by means of the screw $d^2$ and nut $d^3$. The pinion $c^3$ is arranged with a sliding key for enabling it to be removed from the screw spindle $c$ and placed upon the shaft $f$ for effecting the feed of the tool in a vertical or angular direction by the usual bevel gearing indicated in dotted lines. Assuming the stop to be set and adjusted to the amount of feed required and to be locked to the fixed rod by means of the set screw or bolt $d^4$, the ram when approaching the end of the return stroke brings the part $c^{10}$ of the lever $c^7$ against the rod $d$ whereupon the lever is turned and by means of the pawl $c^8$ effects a predetermined rotary movement of the ratchet $c^9$ and consequently a similar movement of the shaft $c^6$ and wheel $c^5$. The latter operates the wheel $c^4$ and thereby the pinion $c^3$ on the screw spindle $c$; this spindle by engaging with the nut $c'$ effecting the lateral traverse of the tool carrier $a$ along the guides at the end of the ram. After the aforesaid feed has been accomplished and the ram begins to move in the reverse or forward direction the part $c^{10}$ of the lever $c^7$ moves away from the rod $d$ and assumes its original position by reason of the weighted end $c^{11}$, the pawl $c^8$ passing the teeth of the ratchet without effecting any movement thereof. If it be desired to effect the vertical feed also by hand it is only necessary to place a handle on the shaft $f$ which is formed with a square end for the purpose.

For enabling the bed or bottom table to perform a similar lateral traversing movement a hand arrangement may be employed comprising a square ended shaft $g$ to which a large lever may be applied. By means of a pinion $g'$ which is keyed to the aforesaid shaft and arranged in gear with a rack $g^2$ fixed to the base $g^3$ of the machine, the bottom table $g^4$ is enabled to be moved when the nature of the work requires it. The arrangement is such that, when the shaft $g$ is rotated by means of the before mentioned lever (not shown), the pinion travels along the rack and so gives the table $g^4$ a lateral movement along the base $g^3$, the table being guided in this movement by the tongue $g^5$. The traverse by hand may however be effected if desired by means of screw, worm or other suitable gearing.

For effecting the automatic movement of the bottom table, the mechanism for operating the ordinary table $h$ may be employed, and, in this connection, the driving wheel $i$ on the center $i'$, the gear train $i^2$, the slotted disk $i^3$ and the connecting rod $i^4$ are utilized. The ratchet lever $i^5$ is connected by a rod $i^6$ to one arm of a bell-crank lever $i^7$, a rod $i^8$ being attached to the other arm of the said lever. The rod $i^8$ is also attached to a lever $i^9$ carrying two pawls $i^{10}$, $i^{11}$, which, respectively, engage with the ratchet wheels $i^{12}$ and $i^{13}$. These ratchet wheels are arranged with their teeth inclined in opposite directions and rotate idly around the shaft $i^{14}$. By means of teeth on the inner faces of the bosses of these ratchet wheels, the double clutch $i^{15}$, which is keyed to the shaft $i^{14}$, can be engaged with either of them by means of the operating handle $i^{16}$. The spur wheel $i^{17}$ is fastened to the other extremity of the shaft $i^{14}$ and meshes with a wheel $i^{18}$ which is keyed to the splined screw $i^{19}$. The latter is carried on the top table $g^4$ and engages with a half nut $i^{20}$ which has its bearings in the base of the machine. In operating, the ratchet wheel $i^5$ is rotated on its center by the connecting rod $i^4$ and slotted disk $i^3$ in the usual manner, and, by means of the rods $i^6$ and $i^8$ and the lever $i^7$, a rotating movement is imparted to the pawl lever $i^9$. This, by means of the pawl $i^{11}$, turns the ratchet wheel $i^{13}$ which is connected to the shaft $i^{14}$ by the clutch $i^{15}$ and motion is communicated through the wheels $i^{17}$ and $i^{18}$ to the screw $i^{19}$. When the lever $i^9$, which has an oscillating movement, is returning to its original position, the pawl $i^{11}$ slides over the inclined faces of its adjacent ratchet wheel $i^{13}$ without rotating the latter. During the whole of the forward and backward motions of the oscillation of the various parts, the pawl $i^{10}$ is sliding over the teeth of the wheel $i^{12}$ during that portion of the oscillation when the wheel $i^{13}$ is being rotated, and rotating the wheel $i^{12}$ when the pawl $i^{11}$ is sliding over the inclined faces of the ratchet $i^{13}$. It will thus be seen that the ratchet wheels are rotated in opposite directions during opposite portions of the oscillation of the working mechanism so that the screw $i^{19}$ can be rotated in either direction according to the ratchet wheel which for the time being is coupled up to the clutch. For traversing the bed by hand, the half nut $i^{20}$ is disengaged from the screw $i^{19}$ by means of the hand lever $i^{21}$ and the quick threaded screw $i^{22}$; a lever is then placed on the square end of shaft $i^{23}$, to which the rack pinion $i^{24}$ is fixed and which meshes with the rack $i^{25}$ attached to the table $g^4$.

In order to avoid removing the ordinary table $h$ from the machine when it is desired to place large objects on the bottom table $g^4$, the former is hinged to the traversing cross slide $h'$, so that, after the latter has been brought to its extreme position, as shown in dotted lines in Fig. 3, the bolts $h^2$ $h^2$ are slackened and drawn out of the open ends of the grooves $h^3$ $h^3$ on the cross slide. The table $h$ is then free to be swung on its fulcrum $h^4$ into the position indicated in broken lines in which it will be seen to be clear of the bottom table $g^4$.

What we claim and desire to secure by Letters Patent of the United States is:—

1. In a shaping machine the combination with the tool carriage of a work table, a laterally movable bottom table, a traversing cross-slide situated between said tool carriage and bottom table, and a table hinged to said cross-slide.

2. In a shaping machine the combination of a tool carriage, a bottom table, a traversing cross-slide situated between said tool carriage and bottom table, a table hinged to said cross-slide, and means for imparting lateral movement to said tool carriage and bottom table.

3. In a shaping machine the combination of a reciprocating ram, a tool carriage on said ram, a bottom table, means for imparting lateral movement to said tool carriage and bottom table, a traversing cross slide situated between said tool carriage and bottom table, and a table hinged to said cross slide.

In testimony whereof we affix our signatures in presence of witnesses.

GEORGE SONNENTHAL.
HENRY BAMFORD.

Witnesses to the signature of G. Sonnenthal:

HENRY W. SONNENTHAL,
VALENTINE CHARLES WOODLEA.

Witnesses to the signature of Hy. Bamford:

J. W. GHUITH,
H. WILSON.